(12) United States Patent
Vyas et al.

(10) Patent No.: US 10,827,539 B2
(45) Date of Patent: Nov. 3, 2020

(54) REMOTE PROVISIONING OF WIRELESS STATIONS WITH CONFIRMATION

(71) Applicant: GainSpan Corporation, San Jose, CA (US)

(72) Inventors: Pankaj Vyas, Bangalore (IN); Vishal Batra, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 710 days.

(21) Appl. No.: 14/964,574

(22) Filed: Dec. 10, 2015

(65) Prior Publication Data

US 2016/0095143 A1 Mar. 31, 2016

Related U.S. Application Data

(63) Continuation-in-part of application No. 14/198,595, filed on Mar. 6, 2014, now Pat. No. 9,326,301.

(30) Foreign Application Priority Data

Oct. 28, 2015 (IN) .......................... 5814/CHE/2015

(51) Int. Cl.
*H04W 12/06* (2009.01)
*H04W 40/24* (2009.01)
(Continued)

(52) U.S. Cl.
CPC .............. *H04W 76/11* (2018.02); *H04W 8/20* (2013.01); *H04W 12/003* (2019.01);
(Continued)

(58) Field of Classification Search
CPC ..... H04W 76/021; H04W 8/20; H04W 12/04; H04W 40/246; H04W 76/02;
(Continued)

(56) References Cited

U.S. PATENT DOCUMENTS 6,286,038 B1 9/2001 Reichmeyer et al.
6,487,403 B2 11/2002 Carroll
(Continued)

FOREIGN PATENT DOCUMENTS

EP 1553746 B1 7/2005
EP 1876759 B1 9/2010
(Continued)

OTHER PUBLICATIONS

Ti SimpleLink™ Wi-Fi® CC3000, http://investor.ti.com/releasedetail.cfm?ReleaseID=731282,Downloaded circa Mar. 1, 2013,pp. 1-10.
CC3000 Smart Config, http://processors.wiki.ti.com/index.php/CC3000_Smart_Config , Downloaded circa Mar. 1, 2013, pp. 1-7.
Two easy ways for WiFi connectivity with CC3000, http://www.ti.com/lit/ml/slyt444/slyt444.pdf , downloaded circa Mar. 1, 2013, pp. 1-3.
(Continued)

*Primary Examiner* — Ricky Q Ngo
*Assistant Examiner* — Ellen A Kirillova
(74) *Attorney, Agent, or Firm* — Pearl Cohen Zedek Latzer Baratz LLP

(57) ABSTRACT

Aspects of the present disclosure are related to provisioning of wireless devices. In an embodiment, a wireless device (sought to be provisioned) receives values for provisioning parameters from an external user device, and attempts to join a wireless local network according to the received values for the provisioning parameters. The wireless device sends a response to the external user device indicating whether or not the joining was successful. The external user device may display the result indicating whether or not provisioning was successful. The wireless device may operate in a time division multiplexed manner as an access point (for securing the credentials) and as a station (once provisioning is complete).

8 Claims, 5 Drawing Sheets

(51) Int. Cl.
| | |
|---|---|
| *H04W 76/11* | (2018.01) |
| *H04W 76/40* | (2018.01) |
| *H04W 8/20* | (2009.01) |
| *H04W 48/00* | (2009.01) |
| *H04W 12/00* | (2009.01) |
| *H04W 84/12* | (2009.01) |
| *H04W 8/18* | (2009.01) |

(52) U.S. Cl.
CPC .......... *H04W 48/00* (2013.01); *H04W 76/40* (2018.02); *H04W 8/18* (2013.01); *H04W 8/186* (2013.01); *H04W 12/06* (2013.01); *H04W 84/12* (2013.01)

(58) Field of Classification Search
CPC ... H04W 76/11; H04W 76/40; H04W 12/003; H04W 48/00
USPC ........................................................ 370/338
See application file for complete search history.

(56) References Cited

U.S. PATENT DOCUMENTS

| | | | |
|---|---|---|---|
| 6,891,807 | B2 | 5/2005 | Roskind et al. |
| 7,120,679 | B2 | 10/2006 | Remer |
| 7,174,564 | B1 | 2/2007 | Weatherspoon et al. |
| 7,240,106 | B2 | 7/2007 | Cochran et al. |
| 7,340,612 | B1 | 3/2008 | Durand et al. |
| 7,493,127 | B2 | 2/2009 | Morgan |
| 7,581,096 | B2 | 8/2009 | Balfanz et al. |
| 7,616,594 | B2 | 11/2009 | Roberts |
| 7,752,345 | B2 | 7/2010 | Duckett |
| 7,808,963 | B2 | 10/2010 | Gupta et al. |
| 7,974,236 | B2 | 7/2011 | Woo |
| 7,986,938 | B1 | 7/2011 | Meenan et al. |
| 8,014,722 | B2 | 9/2011 | Abel et al. |
| 8,041,035 | B2 | 10/2011 | Miller |
| 8,369,880 | B2 | 2/2013 | Citrano, III et al. |
| 2005/0245235 | A1 | 11/2005 | Vesuna |
| 2005/0270989 | A1 | 12/2005 | Park et al. |
| 2006/0069912 | A1* | 3/2006 | Zheng ................ H04L 63/0823 713/151 |
| 2007/0157024 | A1 | 7/2007 | Miller |
| 2007/0226351 | A1* | 9/2007 | Fischer ................ H04W 76/14 709/227 |
| 2009/0081948 | A1 | 3/2009 | Banks et al. |
| 2009/0264098 | A1* | 10/2009 | Lo ...................... G06Q 20/4012 455/411 |
| 2009/0271709 | A1 | 10/2009 | Jin et al. |
| 2010/0165879 | A1 | 7/2010 | Gupta et al. |
| 2012/0102106 | A1 | 4/2012 | Chen |
| 2012/0214414 | A1 | 8/2012 | Abel et al. |
| 2012/0230491 | A1 | 9/2012 | Duo et al. |
| 2012/0252364 | A1 | 10/2012 | Inabathuni et al. |
| 2012/0287219 | A1 | 11/2012 | Ravi et al. |
| 2013/0040576 | A1 | 2/2013 | Yoon |
| 2013/0198274 | A1 | 8/2013 | Papakipos |
| 2013/0288601 | A1 | 10/2013 | Chhabra |
| 2013/0322260 | A1* | 12/2013 | Yao ..................... H04W 72/082 370/241 |
| 2013/0336240 | A1* | 12/2013 | Cherian ............. H04W 76/025 370/329 |
| 2014/0211766 | A1* | 7/2014 | Zhao ................. H04W 72/1215 370/336 |
| 2015/0016436 | A1* | 1/2015 | Namba ................ H04W 84/12 370/338 |

FOREIGN PATENT DOCUMENTS

| | | |
|---|---|---|
| EP | 2487946 A2 | 8/2012 |
| EP | 2549786 A1 | 1/2013 |
| WO | 2007005030 A3 | 12/2007 |

OTHER PUBLICATIONS

CC3000 SimpleLink Wi-Fi, Texas Instruments, 2012, pp. 1-37.
Wi-Fi Protected Setup Specification Version 1.0h, http://gpl.back2roots.org/source/puma5/netgear/CG3200-1TDNDS_GPL/ap/apps/wpa2/original/Wi-Fi%20Protected%20Setup%20Specification%201.0h.pdf, Date Dec. 2006, pp. 1-110.
Hybrid Networks, http://www.qualcomm.com/research/research-areas/hybrid-network, Downloaded circa Mar. 4, 2013, pp. 1-3.
Sony SA-NS410 Network Speaker, http://homenetworking01.info/tags/upnp/, Downloaded circa Mar. 4, 2013, pp. 1-34.
Dipl.-Ing. (BA) Alexander Gutjahr, Dr.-Ing. Axel Sikora, Autonomous commissioning for headless embedded networking devices, http://www.stzedn.de, downloaded circa Mar. 6, 2013, pp. 1-10.
Apple AirPort Express, https://www.apple.com/airportexpress/, Mar. 5, 2013, pp. 1-6.
802.11 Beacons Revealed, http://www.wi-fiplanet.com/tutorials/article.php/1492071/80211-Beacons-Revealed.htm, Downloaded circa Jun. 3, 2013, pp. 1-3.
802.11 WLAN Packet Types, http://www.wildpackets.com/resources/compendium/wireless_lan/wlan_packet_types, Downloaded circa Jun. 3, 2013, pp. 1-2.
Service set (802.11 network), http://en.wikipedia.org/wiki/Service_set_(802.11_network), Downloaded circa Jun. 3, 2013, pp. 1-3.
What Is a Network SSID?, http://www.staples.com/sbd/cre/tech-services/explore-tips-and-advice/tech-articles/what-is-an-ssid.html, Downloaded circa Jun. 3, 2013, pp. 1-1.
Wireless Client Association, http://forums.esds.co.in/index.php?s=206d569d7f027c1c1e0964503647388a, Downloaded circa Jun. 3, 2013, pp. 1-1.
T. Saito, I. Tomoda, Y. Takabatake, K. Teramoto, K. Fujimoto, Wireless gateway for wireless home AV network and its implementation, Consumer Electronics, IEEE Transactions, date Aug. 2001, pp. 496-501, vol. 47, Issue: 3, IEEE Consumer Electronics Society.
T. Dierks, E. Rescorla, RFC 5246—The Transport Layer Security (TLS) Protocol Version 12, date Aug. 2008, pp. 1-105.
Linux wireless, http://wireless.kernel.org/en/developers/Documentation/Glossary?action=print, downloaded circa May 28, 2013, pp. 1-4.
"Smartpass Connect", http://www.juniper.net/us/en/local/pdf/datasheets/1000412-en.pdf, juniper Networks, Inc. Dated: copyright 2012, pp. 1-59.
"Simply Connected", http://community.westcongroup.com/servlet/JiveServlet/downloadBody/5567-102-1-10117/Juniper_SimplyConnectedDemo_WestconTLS%2022%20janv%202013.pdf, juniper Networks, Inc., Dated: Dec. 2012, pp. 1-4.
Kim, I. Yeungnam Univ., Gyeongsan, South Korea ; Young-Tak Kim , "Prediction-based smart channel scanning with minimized service disruption for IEEE 802.11e WLAN", Consumer Electronics; IEEE Transactions on (vol. 57 , Issue: 2 ), Dated: May 2011, p. 1.
Raza, M. ; KGGDC, Karachi, Pakistan ; Hyder, S.I., "A forced routing information modification model for preventing black hole attacks in wireless Ad Hoc network", Applied Sciences and Technology (IBCAST), 2012 9th International Bhurban Conference on Jan. 9-12, 2012, pp. 1-2.
Shudong Chen ; Dept. of Math. & Comput. Sci., Eindhoven Univ. of Technol., Eindhoven ; Lukkien, J., "Secure Resource Control in Service Oriented Applications",Consumer Communications and Networking Conference, 2009. CCNC 2009. 6th IEEE, Dated: Jan. 10-13, 2009 , p. 1.

* cited by examiner

US 10,827,539 B2

REMOTE PROVISIONING OF WIRELESS STATIONS WITH CONFIRMATION

PRIORITY CLAIM AND RELATED APPLICATIONS

The instant patent application is related to and claims priority from the co-pending India provisional patent application (Filed: 28 Oct. 2015) and India non-provisional patent application (Filed: 6 Nov. 2015), both assigned Serial No.: 5814/CHE/2015, Applicant: GainSpan Corporation, and entitled, "Using single radio interface in STATION mode and AP mode concurrently on WiFi Device to obtain network configuration information for STATION mode from configuring device connected to AP mode of WiFi Device AND communicating STATION network connection status to configuring device connected to AP mode", which are incorporated in their entirety herewith to the extent not inconsistent with the disclosure herein.

The instant patent application is a continuation-in-part of and claims priority from co-pending U.S. Non-provisional patent application entitled, "Group Provisioning of Wireless Stations of a Wireless Local Area Network (WLAN)", application Ser. No. 14198595, filed on 6 Mar. 2014, and is incorporated in its entirety herewith.

The present disclosure is related to the following commonly owned US Patent Applications:
- A. application Ser. No. 13/886276; Entitled: Provisioning a Wireless Device for Secure Communication using an Access Point Designed with Push-Button Mode of WPS (Wi-Fi Protected Setup); Filed: 3 May 2013;
- B. U.S. Pat. No. 9,191,771; Entitled: Convenient Use of Push Button Mode of WPS (Wi-Fi Protected Setup) for Provisioning Wireless Devices; Issued: Nov. 17, 2015; and
- C. U.S. Pat. No. 8,862,096; Entitled: Provisioning of Multiple Wireless Devices by an Access Point; Issued: Oct. 14, 2014.

BACKGROUND

1. Technical Field

Embodiments of the present disclosure relate generally to wireless local networks, and more specifically to remote provisioning of wireless stations with confirmation.

2. Related Art

A wireless local network may be viewed as having wireless stations communicatively coupled on wireless paths to each other via an access point (AP). The wireless stations are either the source machines or (target) destination machines for the data packets (from the viewpoint of the wireless network), with the AP operating as a switching device which receives each data packet from a source station and forwards the packet to the destination station. Wireless networks are characterized by devices communicating over short distances (e.g., few tens of meters) and are implemented using standards such as IEEE 802.11, as is well known in the relevant arts.

Wireless stations are generally required to be provisioned before being able to operate as a member of specific wireless local networks, as is well known in the relevant arts. Provisioning entails configuration of the wireless station with appropriate values for corresponding parameters such that the wireless station is thereafter enabled to operate as a member of the wireless local network.

There are several known approaches to remotely provision wireless stations. Remote provisioning implies that an administrator need not physically interface with the wireless station for the purpose of provisioning. Remote provisioning is important in cases such as head-less devices (i.e., devices with very limited user interface elements such as keyboards, buttons, etc.) and devices installed in hard-to-reach locations. Remote provisioning finds particular application in internet of things (IoTs).

It is generally desirable that the remote provisioning meet various requirements suited for corresponding environments.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Aspects of the present disclosure related to provisioning of wireless devices. In an embodiment, a wireless device (sought to be provisioned) receives values for provisioning parameters from an external user device, and attempts to join a wireless local network according to the received values for the provisioning parameters. The wireless device sends a response to the external user device indicating whether or not the joining was successful. The external user device may display the result indicating whether or not provisioning was successful.

In an embodiment, the wireless device operates as an access point while interfacing with the external user device to receive the provisioning parameters. Accordingly, the external user device operates as a wireless station to transmit the values for the provisioning parameters. The wireless device operates as a wireless station in attempting to join the wireless network specified by the configuration parameters.

According to another aspect, the wireless device operates in the AP and station (STA) modes in time division multiplexed manner such that the wireless device can be provided with a single antenna and/or radio (wireless) interface.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
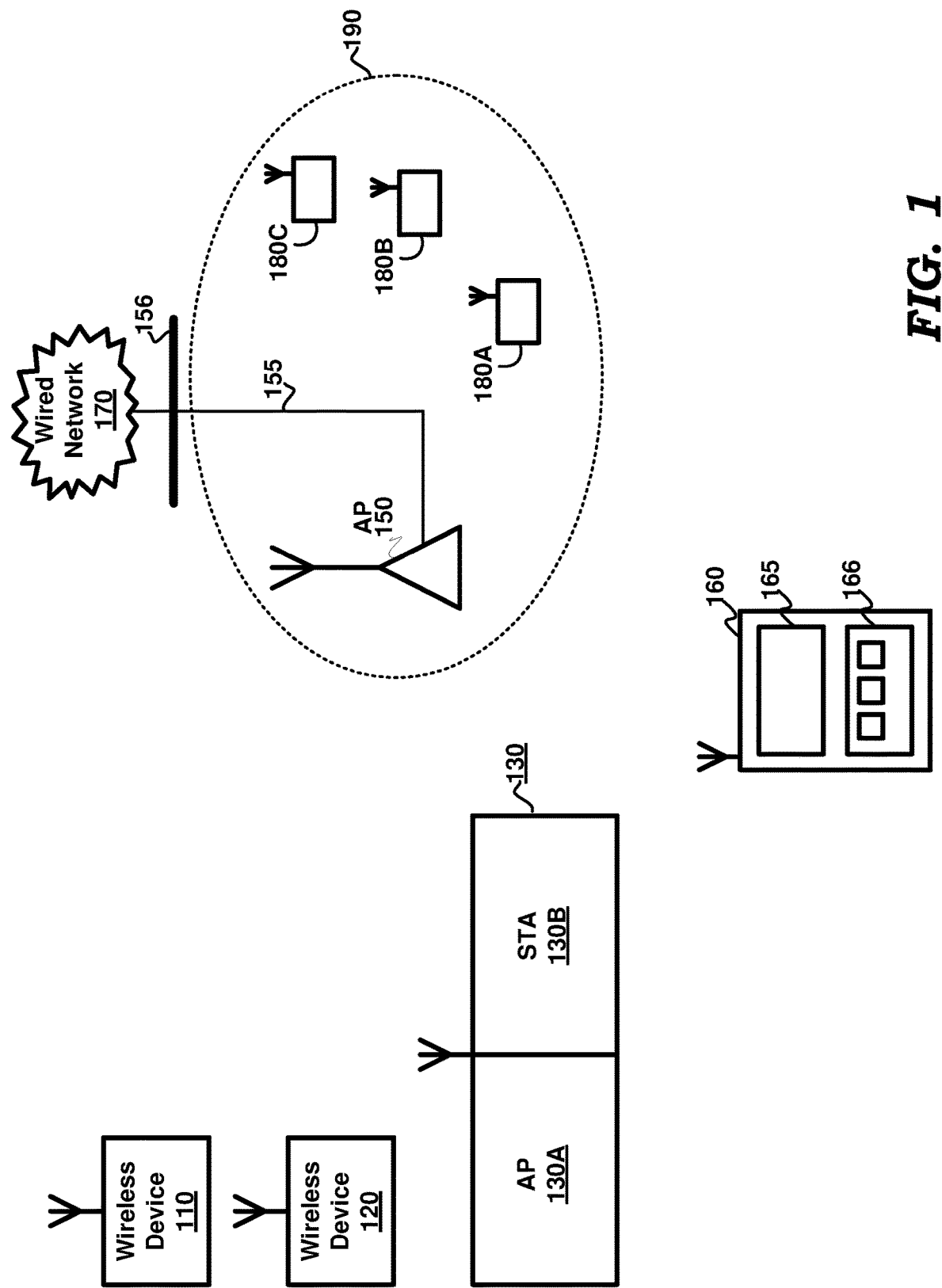
FIG. 1 is a block diagram of an example environment in which several aspects of the present disclosure may be implemented.

FIG. 1 is a block diagram representing an example environment in which several aspects of the present disclosure can be implemented. The example environment is shown containing only representative systems for illustration. However, real world environments may contain more or fewer systems. FIG. 1 is shown containing wireless devices 110, 120 and 130, access point (AP) 150, WLAN wireless stations (or clients) 180A-180C, wired network backbone 156, wired network 170, and provisioning agent 160. Block 190 represents a basic service set (BSS) consistent with the IEEE 802.11 standard(s). Other environments may include more than one BSS, with the BSSs being interconnected to form an extended service set (ESS) consistent with IEEE 802.11 standards.

Each of clients 180A-180C is designed to operate as a wireless station consistent with IEEE 802.11 family of standards (including IEEE 802.11a, 802.11b, 802.11g and 802.11n), and may communicate, via AP 150, with each other as well as with devices/systems on wired network 170. It is assumed that clients 180A-180C are already provisioned to communicate securely via AP 150. Clients 180A-180C may correspond, for example, to laptop computers, smart phones, or wireless sensors.

AP 150 represents a switch/hub operating according to IEEE 802.11 family of standards, and enables associated wireless stations (e.g., 180A-180C) to communicate with each other as well as with systems connected to wired network 170. AP 150 is connected by a wired medium (155) to wired network backbone 156, and thus to wired network 170. Wired network 170 may represent the internet, also known as the World Wide Web.

Wireless devices 110, 120 and 130 represent devices that are capable of communicating wirelessly according to IEEE 802.11 (WLAN) standards, and can selectively operate as an AP or as a wireless station (STA or client). According to an aspect of the present invention described below, wireless device 130 can operate as AP and STA while a user provisions the device, and accordingly wireless device 130 is shown as two portions AP 130A and STA 130B. Once provisioning is completed in accordance with aspects of the present disclosure, wireless device 130 operates as a STA within BSS 190. Each of the other devices 110 and 120 also operates similar to wireless device 130, though the details of these devices are not shown for conciseness.

Each of wireless devices may have a core functionality (e.g., operation as a smart meter, sensor, etc), and the wireless communication capability according to IEEE 802.11 can be used to communicate various data and control parameters of interest with other devices via an AP (for example, AP 150). However, before the wireless devices 110, 120 and 130 can perform such communication, the wireless devices 110, 120 and 130 may need to be provisioned.

As noted above, provisioning generally entails configuring the wireless devices with various parameters that enable the wireless devices to comply with the security measures enforced by an AP, in addition to specifying the particular AP with which to associate and thereafter communicate with other devices. The configuration parameters include SSID (Service Set Identification) of the network and a passphrase, as is well known in the relevant arts.

Provisioning agent 160 represents a device external to each of devices 110, 120 and 130 and also access point 150. As may be readily observed, each of the devices 110/120/130, access point 150 and provisioning agent 160 are implemented as respective separate units. In an embodiment, provisioning agent 160 corresponds to a mobile phone containing display 165 and keyboard 166. Provisioning agent 160 facilitates users to provision wireless devices 110, 120 and 130. Provisioning agent 160 may contain the necessary application software needed to enable provisioning of wireless devices 110, 120 and 130.

The manner in which each of wireless devices can operate to facilitate provisioning, is illustrated next with respect to a flowchart.

3. Facilitating Provisioning

Figure 2:
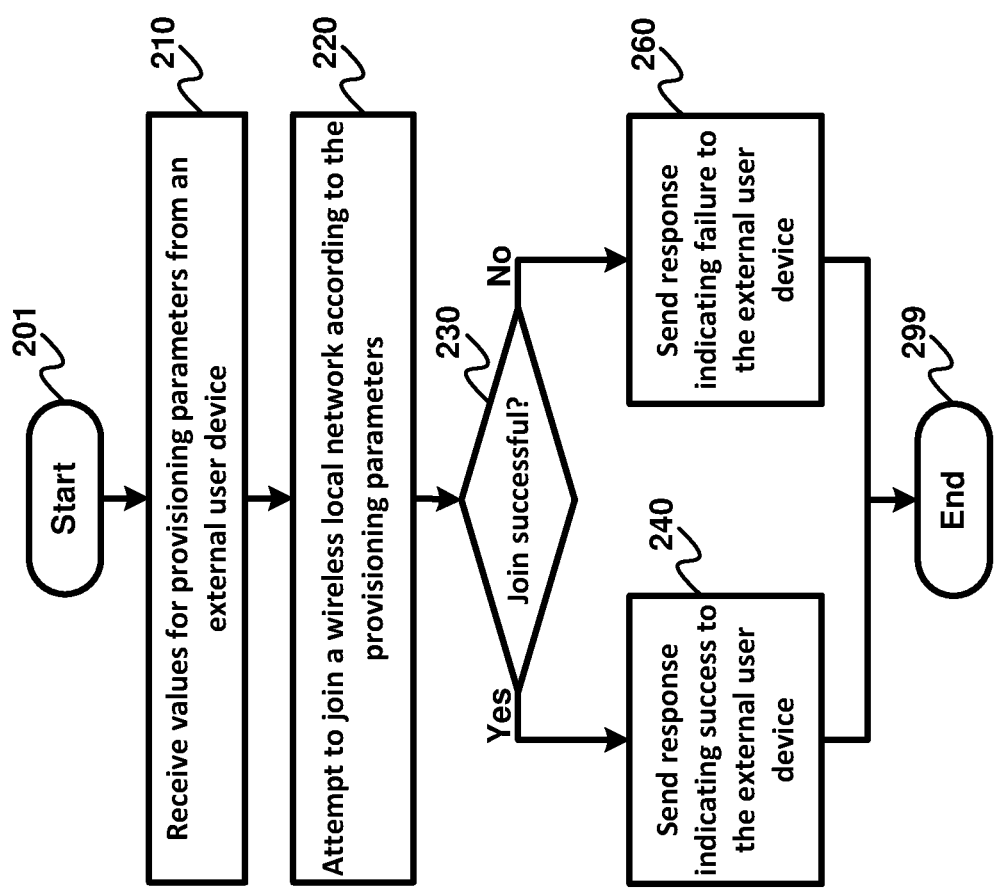
FIG. 2 is a flow chart illustrating the manner in which a wireless device facilitates provisioning, in an embodiment of the present disclosure.

FIG. 2 is a flow chart illustrating the manner in which a network device facilitates self-provisioning in an embodiment of the present disclosure. Merely for illustration, the flowchart is described below with respect to wireless device 130. However, the features can be implemented in other wireless devices also, as well as in other environments, without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, wireless device 130 receives values for provisioning parameters from provisioning agent 160, as a part of remote provisioning. The provisioning parameters can include channel number, SSID, security type and security credentials, as is well known in the relevant arts. Control then passes to step 220.

In step 220, wireless device 130 attempts to join a wireless local network according to the provisioning parameters received in step 210. Assuming the SSID received is that of BSS 190, wireless device 130 attempts to join BSS 190. Such attempt to join a wireless network may entail transmitting the association and authentication information, and receiving the corresponding responses. Control then passes to step 230.

In step 230, wireless device 130 determines whether the join is successful. In an embodiment, the determination entails sending an additional packet (e.g., ICMP Ping) to an AP of the joined network, based on layer-2 parameter values corresponding to the joined wireless network. Accordingly, if a response is received for the additional packet, joining may be deemed to be successful. In an alternative embodiment, receipt of positive acknowledgements corresponding to authentication and association frames may be deemed be successful joining. Control passes to step 240 upon successful join, and to step 260 otherwise.

In step 240, wireless device 130 sends a response indicating success to provisioning agent 160. Provisioning agent 160 can display a suitable message to the user seeking to provision wireless device 130. Control then passes to step 299.

In step 260, wireless device 130 sends a response indicating failure to the external user device. Provisioning agent 160 can display a suitable message to the user seeking to provision wireless device 130. Control then passes to step 299.

It may accordingly be appreciated that a user is notified of success or failure of provisioning sought to be performed remotely. The user can accordingly take any requisite action upon failure notification, and be comfortable upon success notification.

The operations of the steps of the flowcharts of FIG. 2 are illustrated next with examples.

4. Timing Diagram

Figure 3:
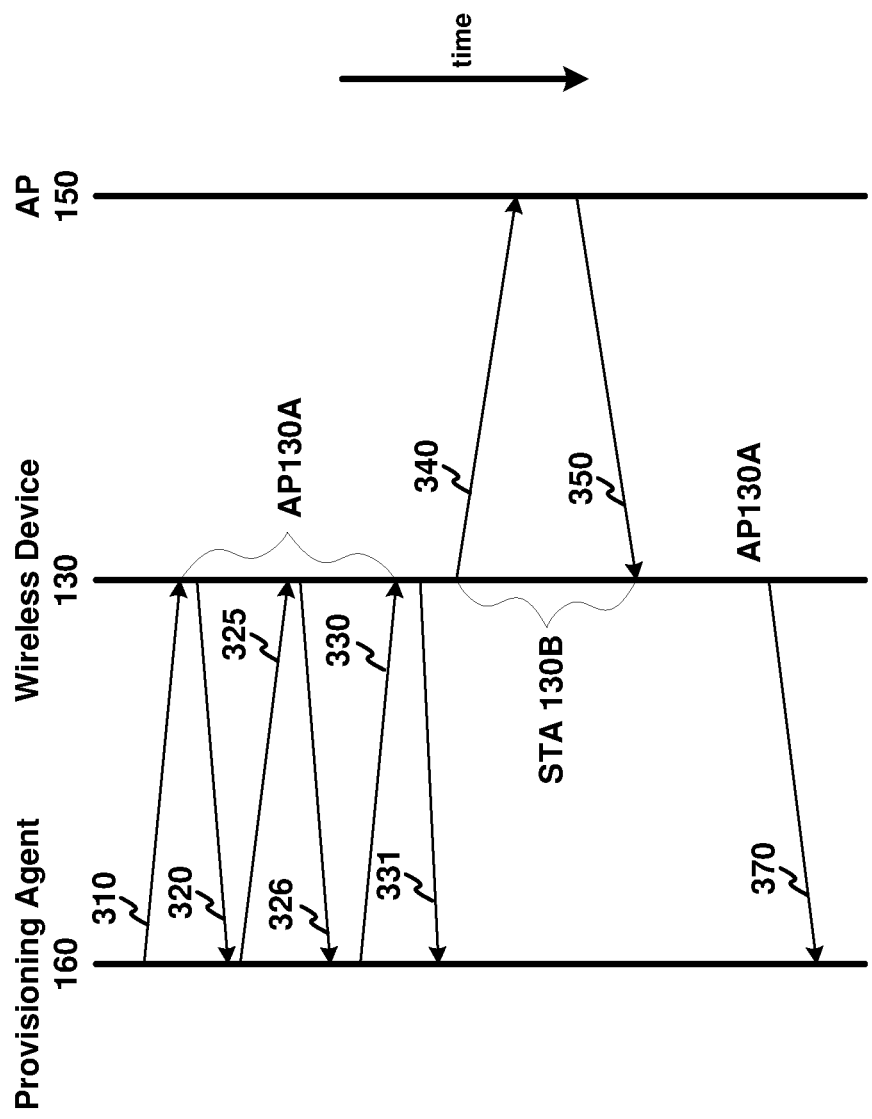
FIG. 3 is a timing diagram illustrating provisioning and confirmation of such provisioning, in an embodiment of the present disclosure.

FIG. 3 is a diagram illustrating the sequence of messages exchanged (in an embodiment) between respective devices in provisioning wireless device 130 as described above with respect to flowchart of FIG. 2. In an embodiment, wireless device 130 operates as AP in some durations and as STA (wireless station) in some other durations. The corresponding durations of operation as AP and STA are respectively shown in FIG. 3. The durations of operation as STA and AP are time division multiplexed (TDM), and accordingly the related capability of wireless device 130 is referred to as TDM capability. The interactions between the devices are described in terms of corresponding events (with each event constituting one or more messages).

In event 310, provisioning agent 160 checks whether wireless device has TDM capability (by sending appropriate packets/messages). In event 320, wireless device 130 responds confirming TDM capability. The messages can be exchanged according to any convention. In one embodiment, provisioning agent 160 (operating as a STA) sends a probe request 310 in accordance with IEEE 802.11 standards, with an additional proprietary IE (information element) field checking the TDM capability of wireless device 130. Probe response 320 (from AP 130A) may confirm wireless device 130 having TDM capability, in addition to requesting provisioning parameters from provisioning agent 160.

Instead of probe request and response (310 and 320 respectively), wireless device 130 (AP 130A) may advertise in beacons (using appropriate extensions, in a known way) the availability of TDM capability.

In event 325, provisioning agent 160 sends messages representing association/authentication request to AP 130A. In event 326, AP 130A sends a response to the request. It is assumed that the association/authentication is successful. Open authentication approach may be used, thereby not requiring provisioning agent 160 to provide any authentication information.

In event 330, provisioning agent 160 transmits provisioning parameters to AP 130A. These provisioning parameters are assumed to be provided by a user or administrator seeking to remotely provision wireless devices using provisioning agent 160.

It should be understood that the parameters are for wireless device 130 (STA 130B) to operate as a part of BSS 190. Any convention can be used to send the values for the parameters, while an example approach is shown below:

```
POST /system/config/network
<network>
    <mode>client-verify</mode>
```

```
    <client>
        <wireless>
            <channel>6</channel>
            <ssid>MyRouter</ssid>
            <security>wpa-personal</security>
            <password>abcdefgh</password>
        </wireless>
        <ip>
            <ip_type>dhcp</ip_type>
        </ip>
    </client>
</network>
```

In the above illustration, MyRouter is the SSID corresponding to BSS 190. While wpa-personal security mode is shown above for illustration, alternative security modes can be used in other instances. For example, in business context, 'Enterprise security' mode can be specified, which would cause AP 150 to authenticate using external authentication server (not shown).

In event 331, AP 130A confirms receipt of the values for the provisioning parameters. The values may be stored in a non-volatile memory, accessible by both AP and STA operation of wireless device 130. By storing the values, configuration of the wireless device 130, and thus provisioning, may be deemed to be complete.

It should be appreciated that the provisioning parameters (and corresponding values) may be provided on a connection secured at Layer-2 (MAC) and/or Layer 4 (transport). The security in Layer 2 is as defined in IEEE 802.11 standard and Layer 4 security is as defined in SSL (Secured Socket Layer) and DTLS (Datagram Transport Security Layer).

Thereafter, wireless device 130 operates as STA 130B. Accordingly, in event 340, STA 130B sends association/authentication messages using the parameter values received above. In event 350, STA 130B receives confirmation of successful association/authentication.

Though not shown, STA 130B may in addition send an ICMP Ping packet to AP 150 to further confirm that the joining is successful. Accordingly, the provisioning parameters received may include the IP address of AP 150 (though not shown in the POST exchange of above). Thus, based on one or more of event 350 and ICMP response, STA 130B may conclude whether the association with AP 150 is successful or not.

In event 370, wireless device 130 is shown to have reverted to operating as AP 130A, and passing on the result of association to provisioning agent 160. The result of association is displayed to the user as the result of provisioning. Thus, if STA 130B is deemed to successfully communicate with AP 150, the provisioning result is communicated to be successful, or else a failure result is communicated.

After event 370, wireless device 130 may continue to operate exclusively as STA 130B, as a part of BSS 190 if provisioning is successful. Provisioning agent 160 may await message corresponding to event 370 only if event 320 has confirmed availability of TDM capability. In the absence of such capability being communicated, provisioning agent 160 may not wait for event 370, and the administrator may not have the benefit of confirmation of provisioning, even if the provisioning completed successfully at event 330.

Thus, by having the confirmation, the administrator may reliably ensure all the wireless devices are appropriately provisioned. The description is continued with respect to an illustration of the internal blocks of wireless device 130 in an embodiment.

5. Wireless Device

Figure 4:
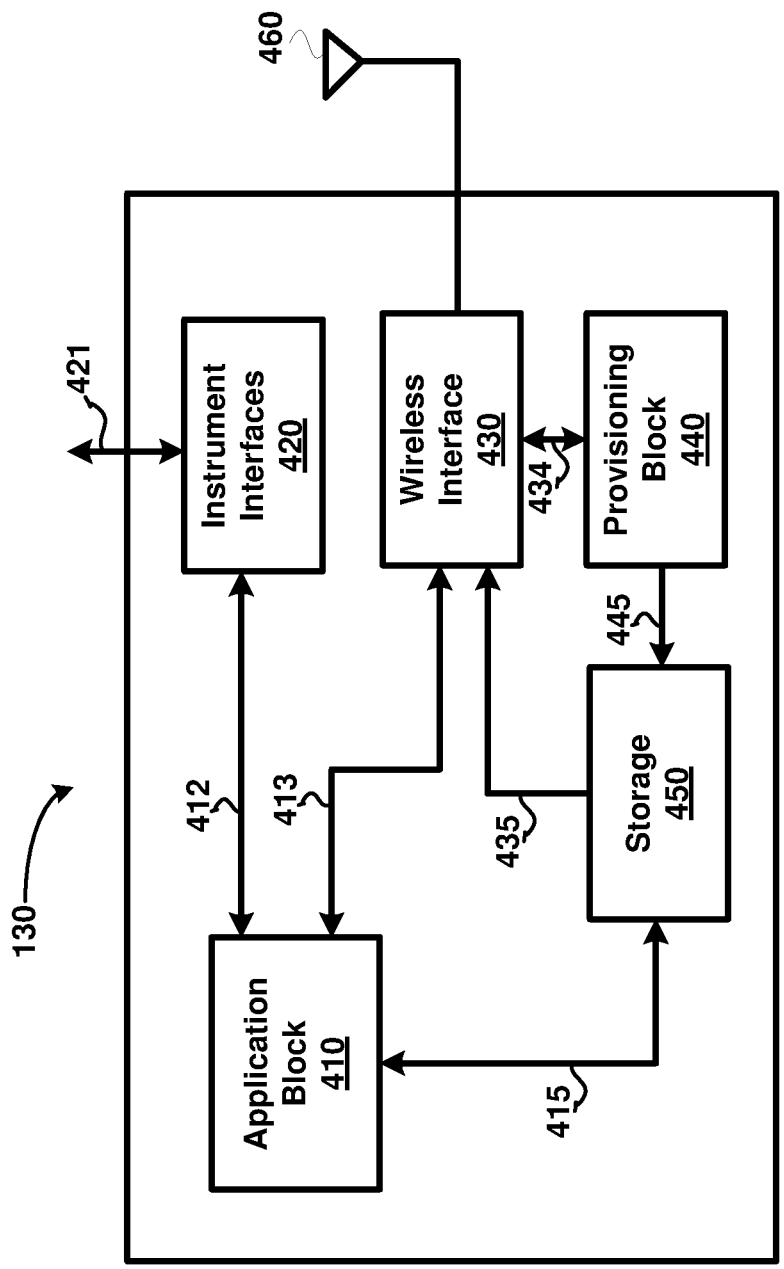
FIG. 4 is a block diagram illustrating the implementation details of a wireless device in an embodiment of the present disclosure.

FIG. 4 is a block diagram illustrating the internal blocks of wireless device 130, in an embodiment. Wireless device 130 is shown containing application block 410, instrument interfaces 420, wireless interface 430, antenna 460, provisioning block 440 and storage 450.

Instrument interfaces 420 represent interfaces to sensors, actuators, or other devices which may be connected (via path 421) to wireless device 130 to enable wireless device 130 to provide the core functionality noted above.

Application block 410 represents one or more applications that execute in wireless device 130 to provide desired features. For example, applications 410 may represent data collection or control applications such as those required in industrial control systems. Applications in application block 410 may operate on data received from external sensors via instrument interfaces 420 on path 412, as well as provide outputs on path 421 to external actuators via instrument interfaces 420. Applications in application block 410 may communicate with other systems/devices via wireless interface 430 and path 413.

Wireless interface 430 represents the combination of hardware, software and firmware components that enable wireless device 130 to communicate wirelessly (via antenna 460) according to IEEE 802.11 standards. It may be observed that the communications of FIG. 2 are via wireless interface 430, since provisioning agent 160 and AP 150 are external to wireless device 130, and communication is by wireless medium. Storage 450 contains both volatile (random access) and non-volatile hardware components. The non-volatile component may be used for storing the provisioning parameters (and associated values) when obtained from provisioning agent 160.

Provisioning block 440 operates to enable provisioning of wireless device 130 according to various aspects of the present invention as described in detail above. Thus, provisioning block 440 may (in conjunction with wireless interface 430) perform the steps of FIG. 2, including operating wireless device 130 in AP and STA modes as described above. Provisioning block 440 may store (via path 445) in storage 450, the SSID and secure credentials (obtained during provisioning) for joining BSS 190 and communicating with/via AP 150 thereafter. For subsequent operations, wireless interface 430 may directly fetch the stored credentials and SSID from storage 450 via path 435. Applications in application block 410 may also use the non-volatile portion of storage 450 for storing of data via path 415.

It should be appreciated that the blocks of FIG. 4 can be enabled with the features described above as a desired combination of one or more of hardware, executable modules, and firmware. The description is continued with respect to an example embodiment in which several features of the present invention are operative on execution of corresponding executable modules.

6. Digital Processing System

Figure 5:
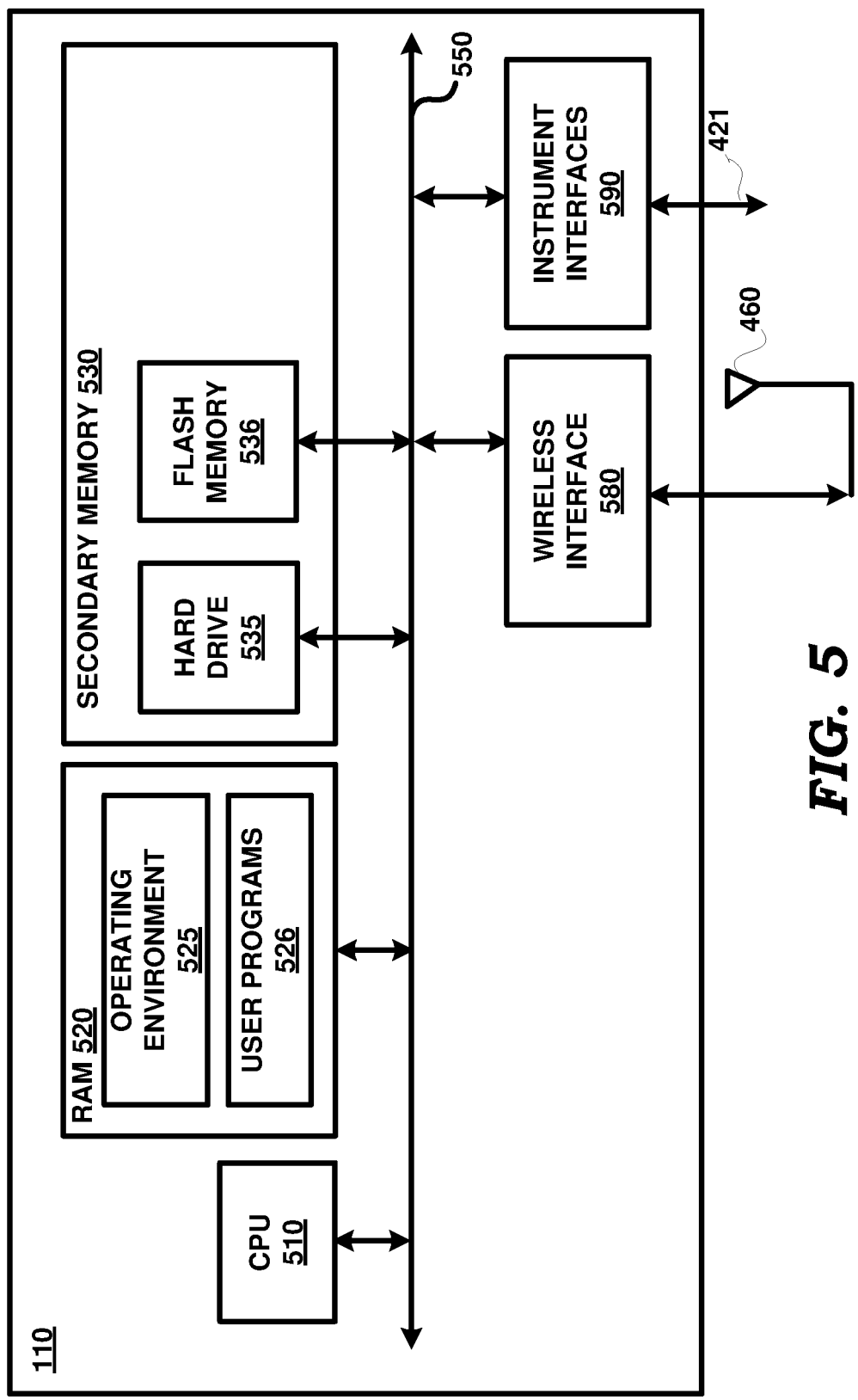
FIG. 5 is a block diagram illustrating the implementation details of a wireless device in another embodiment of the present disclosure.

FIG. 5 is a block diagram illustrating the details of wireless device 130 in an embodiment in which various aspects of the present invention are operative by execution of appropriate executable modules. Wireless device 130 may contain one or more processors such as a central processing unit (CPU) 510, random access memory (RAM) 520, secondary memory 530, wireless interface 580 and instrument interfaces 590. All the components may communicate with each other over communication path 550, which may contain several buses as is well known in the relevant arts.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 (non-transitory/non-volatile machine readable storage medium) via communication path 550. RAM 520 is shown currently containing software instructions constituting operating environment 525 and/or other code/user programs 526. In addition to operating system 525, RAM 520 may contain other software programs such as device drivers, etc., which provide a (common) run time environment for execution of code/programs/applications (in the form of execution entities).

Secondary memory 530 is shown containing hard drive 535 and flash memory 536. Secondary memory 530 stores data and software instructions (code), which enable wireless device 130 to be provisioned in accordance with the present disclosure. In addition, secondary memory 530 may contain code to enable wireless device 130 to communicate with other devices, and provide user-level features as well. The software instructions (and additionally data) may either be copied to RAM 520 prior to execution by CPU 510, or may be executed directly from flash memory 536. Application block 410 and provisioning block 440 of FIG. 4 may be contained in the software instructions (code) stored in secondary memory 530.

Wireless interface 580 and instrument interfaces 590 correspond respectively to wireless interface 430 and instrument interfaces 420 of FIG. 4.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of provisioning a wireless device, said method being performed in said wireless device, said method comprising:
receiving values for provisioning parameters from an external user device;
attempting to join a wireless local network according to the received values for the provisioning parameters;
sending a response that includes a positive acknowledgment to said external user device that indicates whether or not said joining was successful;

operating as an access point for said receiving such that said external user device operates as a wireless station to transmit said values for said provisioning parameters;
operating as a wireless station for said attempting;
sending an additional packet to an access point (AP) after completion of said joining; and
determining that said joining is successful only if a response is received to said additional packet, and determining that said joining is unsuccessful otherwise,
wherein said wireless device operates in time division multiplexed (TDM) mode such that said wireless device operates as said access point in a first set of durations and as said wireless station in said second set of durations, wherein none of said first set of durations overlaps with any of said second set of durations, whereby said values are received from said external user device and said response is sent in said first set of durations and said attempting is performed in said second set of durations, and
wherein said wireless device operates exclusively as said wireless station after sending said response if said joining was successful.

2. The method of claim 1, wherein said additional packet is sent and corresponding response to said additional packet is received in said second set of durations.

3. The method of claim 2, wherein said provisioning parameters comprise a service set identifier (SSID) of said wireless local network and security credentials required to join said wireless local network, wherein said attempting to join comprises transmitting packets for association with said wireless local network and authentication based on values received for a set of authentication parameters.

4. The method of claim 1, further comprising:
sending data to said external user device indicating whether or not said wireless device has the ability to operate in said TDM mode; and
wherein said response is sent to said external device only if said sent data indicates that said wireless device has the ability to operate in said TDM mode.

5. A non-transitory machine readable medium storing one or more sequences of instructions in a wireless device, wherein execution of said one or more instructions by one or more processors contained in said wireless device enables said wireless device to perform the actions of:
receiving values for provisioning parameters from an external user device;
attempting to join a wireless local network according to the received values for the provisioning parameters;
sending a response that includes a positive acknowledgment to said external user device that indicates whether or not said joining was successful;
operating as an access point for said receiving such that said external user device operates as a wireless station to transmit said values for said provisioning parameters;
operating as a wireless station for said attempting;
sending an additional packet to an access point (AP) after completion of said joining; and
determining that said joining is successful only if a response is received to said additional packet, and determining that said joining is unsuccessful otherwise,
wherein said wireless device operates in time division multiplexed (TDM) mode such that said wireless device operates as said access point in a first set of durations and as said wireless station in said second set of durations, wherein none of said first set of durations overlaps with any of said second set of durations, whereby said values are received from said external user device and said response is sent in said first set of durations and said attempting is performed in said second set of durations, and
wherein said wireless device operates exclusively as said wireless station after sending said response if said joining was successful.

6. The non-transitory machine readable medium of claim 5, wherein said provisioning parameters comprise a service set identifier (SSID) of said wireless local network and security credentials required to join said wireless local network, wherein said attempting to join comprises transmitting packets for association with said wireless local network and authentication based on values received for a set of authentication parameters.

7. A wireless device comprising: a processing block and a memory, said memory to store instructions which when retrieved and executed by said processing block cause said wireless device to perform the actions of:
receiving values for provisioning parameters from an external user device;
attempting to join a wireless local network according to the received values for the provisioning parameters;
sending a response that includes a positive acknowledgment to said external user device that indicates whether or not said joining was successful;
operating as an access point for said receiving such that said external user device operates as a wireless station to transmit said values for said provisioning parameters;
operating as a wireless station for said attempting;
sending an additional packet to an access point (AP) after completion of said joining; and
determining that said joining is successful only if a response is received to said additional packet, and determining that said joining is unsuccessful otherwise,
wherein said wireless device operates in time division multiplexed (TDM) mode such that said wireless device operates as said access point in a first set of durations and as said wireless station in said second set of durations, wherein none of said first set of durations overlaps with any of said second set of durations, whereby said values are received from said external user device and said response is sent in said first set of durations and said attempting is performed in said second set of durations, and
wherein said wireless device operates exclusively as said wireless station after sending said response if said joining was successful.

8. The wireless device of claim 7, wherein said memory further comprises instructions to enable said wireless device to perform the actions of: sending data to said external user device indicating whether or not said wireless device has the ability to operate in said TDM mode; and wherein said response is sent to said external device only if said sent data indicates that said wireless device has the ability to operate in said TDM mode.

* * * * *